United States Patent [19]

Dove et al.

[11] Patent Number: 5,565,178
[45] Date of Patent: Oct. 15, 1996

[54] METHOD AND APPARATUS FOR REMOVING FUMIGATION GASES FROM FUMIGATED STRUCTURES

[75] Inventors: Robert L. Dove, Mt. Crawford; Donald G. Shaheen, Harrisonburg, both of Va.

[73] Assignee: Degesch America, Inc., Weyers Cave, Va.

[21] Appl. No.: 388,141

[22] Filed: Feb. 13, 1995

Related U.S. Application Data

[62] Division of Ser. No. 25,431, Mar. 3, 1993, Pat. No. 5,417,921.

[51] Int. Cl.⁶ .................................................. B01D 50/00
[52] U.S. Cl. ................ 422/181; 95/116; 96/132; 96/136; 422/177; 422/218; 422/234
[58] Field of Search .................... 422/218, 171, 422/177, 181, 311, 312, 900, 120, 122, 234; 423/210; 426/312, 320, 418, 419; 43/125; 95/116; 96/131, 132, 133, 135, 136

[56] References Cited

U.S. PATENT DOCUMENTS

| | | | |
|---|---|---|---|
| 2,315,208 | 3/1943 | Kinnaird | 422/218 |
| 3,041,684 | 7/1962 | Dawson et al. | 422/32 X |
| 3,874,854 | 4/1975 | Hunter, Jr. | 422/181 X |
| 4,185,079 | 1/1980 | Munday et al. | |
| 4,200,657 | 4/1980 | Cook | |
| 4,532,115 | 7/1985 | Nishino et al. | |
| 4,578,256 | 3/1986 | Nishino et al. | |
| 4,595,575 | 6/1986 | Oeste et al. | |
| 4,756,117 | 7/1988 | Friemel | |
| 4,781,900 | 11/1988 | Tom et al. | |
| 4,784,837 | 11/1988 | Kitayama et al. | |
| 4,812,291 | 3/1989 | Friemel et al. | |
| 4,966,755 | 10/1990 | Smith | 422/28 |
| 4,971,771 | 11/1990 | Stahl | |
| 4,975,254 | 12/1990 | Svara et al. | |
| 4,983,363 | 1/1991 | Tom et al. | |
| 4,996,030 | 2/1991 | Kitacha et al. | |
| 5,024,823 | 6/1991 | Gokcek | |
| 5,037,624 | 8/1991 | Tom et al. | |
| 5,126,117 | 6/1992 | Schumacher et al. | |

FOREIGN PATENT DOCUMENTS

| | | | |
|---|---|---|---|
| 129169 | 1/1978 | Germany | 96/132 |

Primary Examiner—Robert J. Warden
Assistant Examiner—Krisanne M. Thornton
Attorney, Agent, or Firm—Arnold, White & Durkee

[57] ABSTRACT

An apparatus for removing fumigation gasses from fumigated structures is provided. Air is directed from a structure through an adsorption unit and then recirculated back into the structure. A fan directs air through the adsorption unit. The adsorption unit contains an annularly shaped adsorption bed and an inner passage way and outer passage way through which fumigation gasses are directed. A lower adsorption efficiency per pass through the adsorption bed is used in conjunction with multiple passes with the method of the present invention.

18 Claims, 5 Drawing Sheets

METHOD AND APPARATUS FOR REMOVING FUMIGATION GASES FROM FUMIGATED STRUCTURES

This is a divisional of application Ser. No. 08/025,431, filed Mar. 3, 1993, issued on May 23, 1995 as U.S. Pat. No. 5,417,921.

BACKGROUND OF THE INVENTION

The present invention relates to the fumigation of agricultural products. More particularly, an apparatus and method are provided for removing fumigation gasses from a structure.

Various fumigation methods are used to control pests in agricultural products. In general, a fumigation agent is placed in an agricultural storage structure in order to control any pests present. For example, widely used fumigation agents include aluminum phosphide and magnesium phosphide (both of which release hydrogen phosphide gas). Methyl bromide is also widely used as a fumigation agent. The pests to be controlled are usually insects such as the lesser grain borer and the granary weevil, but also may include rodents. Numerous agricultural products such as grains, rice, beans, and tobacco may be fumigated. The fumigation may occur in a variety of different agriculture storage or transportation structures or facilities including, for example, silos, bins, warehouses, caverns, railroad cars, barges or ships.

Prior to a fumigation, the structure is generally sealed in a gas tight manner to minimize the escape of the fumigation gasses into the atmosphere. In performing a fumigation, a fumigation agent may be introduced to the storage structure in the form of a liquid, solid or gas. Gasiform fumigants released from the fumigation agent then travel throughout the agricultural product and kill the pests. In order to uniformly spread the fumigation gasses, the agricultural product may be mixed as the dose is applied, the fumigation agent may be probed into the product, or the air within the structure may be circulated. For example, U.S. Pat. No. 4,200,657 to Cook discloses a method of recirculating the air within a structure in order to aid the fumigation gas distribution.

Following an appropriate fumigation exposure time, the structure is usually ventilated to remove the fumigation gasses. Traditionally a structure was exhausted by simply opening the structure to allow the gases to escape or be blown into the atmosphere. However, as safety and environmental concerns increased, there arose a need to prevent fumigation gasses from escaping into the atmosphere, and thus methods of "scrubbing" or removing fumigation gasses from exhaust gas streams have been developed. For example, U.S. Pat. No. 4,966,755 to Smith discloses a method of removing fumigation gases from an enclosure. In that method, the gas is pumped through an absorbent chamber that removes any hazardous material prior to exhausting the gas to the atmosphere. Likewise, U.S. Pat. No. 4,812,291 to Friemel et al. discloses a method of removing hydrogen phosphide from a storage structure after fumigation. In Friemel, air from a fumigated structure is blown by a fan through beds containing a hydrogen phosphide binding and decomposition catalyst. Upon passing through the beds, the air is exhausted to the atmosphere.

Fumigation scrubbing methods such as disclosed by Smith and Friemel et al. generally entail a single pass of the air through an adsorbent bed prior to exhausting the air to the atmosphere. Thus, such systems remove substantially all of the fumigation gas in a single pass through adsorption beds and such methods generally use a large amount of adsorbent material and large fans or pumps for each adsorption unit. Thus, the costs of each adsorption unit may be high and the size large. It is desirable to minimize both the costs and size and to create a portable system.

SUMMARY OF THE INVENTION

The present invention in a broad aspect comprises a method and apparatus for removing a gasiform fumigant from an agricultural storage structure by utilizing recirculation. A sorption unit that contains a sorbent material is provided. Fumigant from the structure is forced through the sorption unit and then an output gas from the sorption unit is recirculated into the structure.

Using the method and apparatus of the present invention, the sorption unit may have a low efficiency per pass but use multiple passes to achieve a selected level of fumigant removal. Preferably, an adsorbent material is used to remove a fumigant such as hydrogen phosphide. Gas flow rates of less than about 2000 cfm are generally contemplated.

The present invention may be utilized in conjunction with the introduction of gaseous hydrogen phosphide into an agricultural storage structure. The hydrogen phosphide may then be removed by using the recirculation method and apparatus described.

It is further contemplated that the adsorption unit of the present invention will comprise a first and second port enabling air to flow through the unit, an adsorbent bed containing adsorbent material, and a first and second passageway within the unit. Preferably, the adsorbent bed and one passageway are annularly shaped while the other passageway is cylindrically shaped. The adsorption unit may be connected to a fan and the storage structure through air ducts.

DETAILED DESCRIPTION

Figure 1:
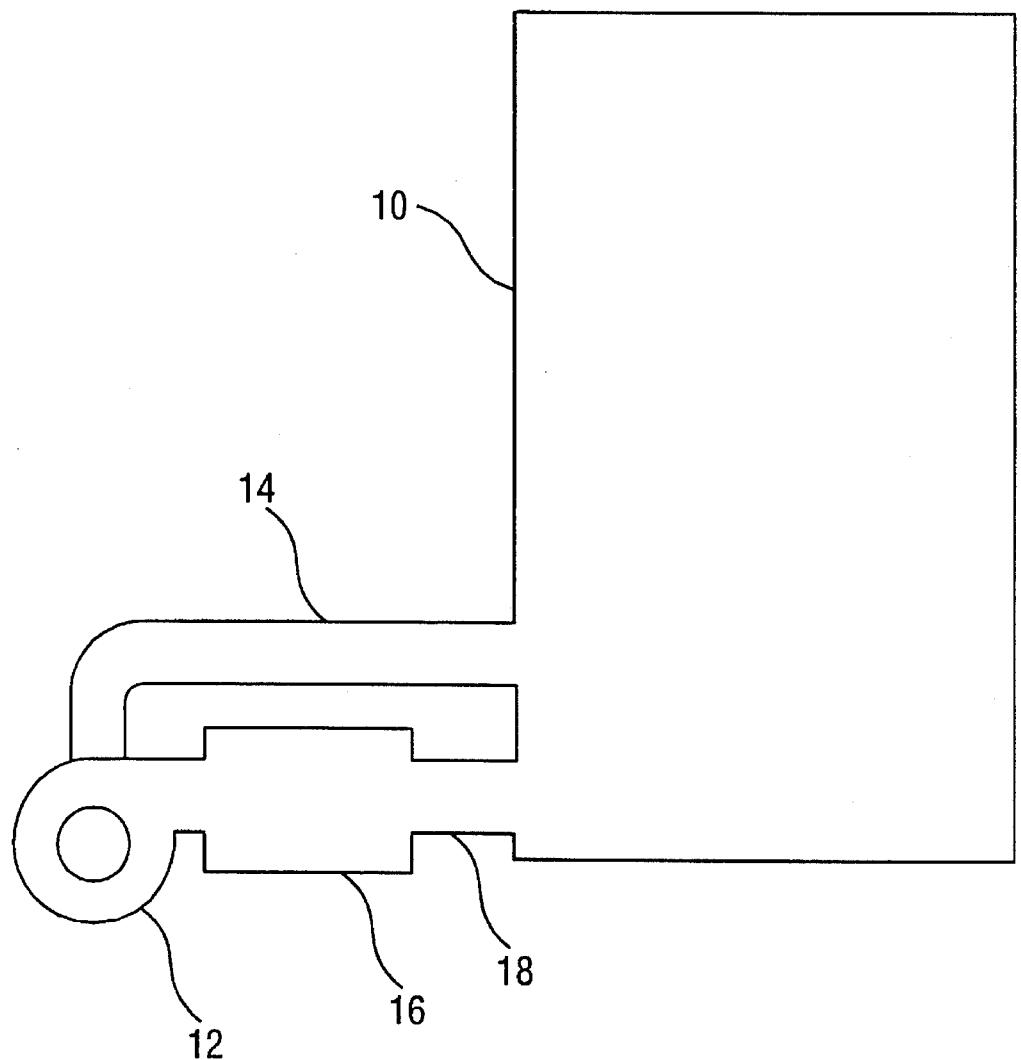
FIG. 1 is a schematic, side view of a fumigation gas removal system according to the present invention connected to an agricultural storage structure.

Referring to FIG. 1, there is shown an embodiment of the present invention. An agricultural storage structure 10, such as a warehouse, silo, barge, ship, railroad car, etc., containing an agricultural product is treated with a fumigating agent. The fumigation agent may be applied in a variety of methods known to those skilled in the art. When it is desired to remove the gasiform fumigant from the air within structure 10, blower or fan 12 circulates or purges air from structure 10 though an air duct 14 to an adsorption unit 16 and then back into structure 10 via air duct 18. Air ducts 14 and 18 may be especially designed for fumigation gas removal purposes, or they may be ducts already installed for other fumigation purposes. Air ducts 14 and 18 may terminate at edge of structure 10 as shown in FIG. 1 or they may extend a distance into structure 10. Further, air duct 14 may be placed above air duct 18 as shown in FIG. 1, or alternatively, may be placed below air duct 18. Adsorption unit 16 contains an adsorbent material that removes the fumigating gas from the air as the air passes through the adsorption unit. According to the present invention, recirculation is thus provided so that air within structure 10 may flow through adsorption unit 16 in a multi-pass manner during removal of the fumigating gas.

Recirculation provides a variety of advantages over the single-pass fumigation gas removal methods shown in the prior art. A single-pass method requires a substantially 100% adsorption efficiency. That is, as air flows through a single-pass adsorption unit the fumigating gas must be removed below an acceptable level in a single-pass. An acceptable level of gas removal will depend on the particular application. For example, when removing hydrogen phosphide from the air, it may be desirable to remove more than 96% of the hydrogen phosphide prior to exhausting the air to the atmosphere. The multi-pass method and apparatus of the present invention, though, does not require such a high efficiency per pass. Rather, the system has a lower adsorption efficiency per pass and uses multiple passes to remove the fumigating agent below the user's acceptable level. Thus, the amount of adsorbent material required for adsorption unit 16 is less than for a single-pass unit. Furthermore, in accordance with the present invention, the recirculation may be carried out over a longer period of time with smaller fans than generally used with single-pass methods. Thus, reductions in costs and size are available when using the present invention.

Alternative embodiments other than the one shown in FIG. 1 may be used with the present invention. For example, fan 12 may be placed between adsorption unit 16 and air duct 18. In addition, the air flow may be created in either direction, for example from structure 10 through air duct 18 and back into structure 10 via air duct 14. Alternatively, fan 12, adsorption unit 16 and air ducts 14 and 18 may be contained within structure 10.

Figure 1A:
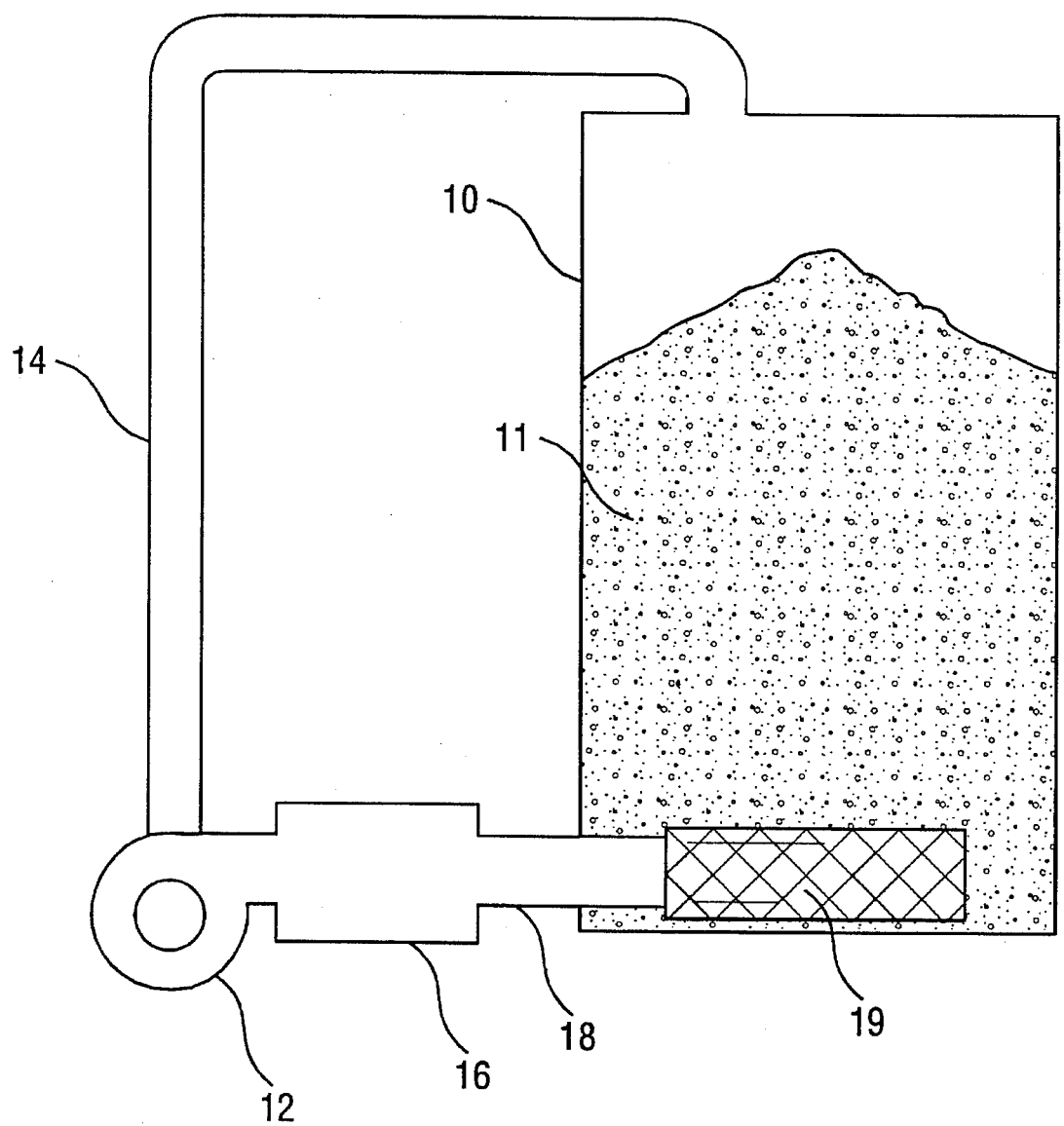
FIG. 1A is a schematic, side view of an alternative fumigation gas removal system according to the present invention connected to an agricultural storage structure.

FIG. 1A displays another alternative embodiment. Recirculation is achieved in the system shown in FIG. 1A similar to the system shown in FIG. 1 except air duct 14 is placed at the top of structure 10 and air duct 18 is placed under agricultural product 11. Aeration manifold 19 or other means known in the art aids in distributing the air returning to structure 10. Recirculation does not have to occur in a top to bottom manner but rather may occur from bottom to top.

Alternatively, air ducts 14 and 18 may draw and return air from the top of structure 10. Finally, depending on the placement of adsorption unit 16 or fan 12, it is noted that fan 12 or adsorption unit 16 may connect directly with structure 10 rather than through air ducts or even simply be placed inside structure 10 without using air ducts. Thus various embodiments of the invention exist; however, in all the embodiments discussed above, multi-pass recirculation through adsorption unit 16 is possible.

Figure 2:
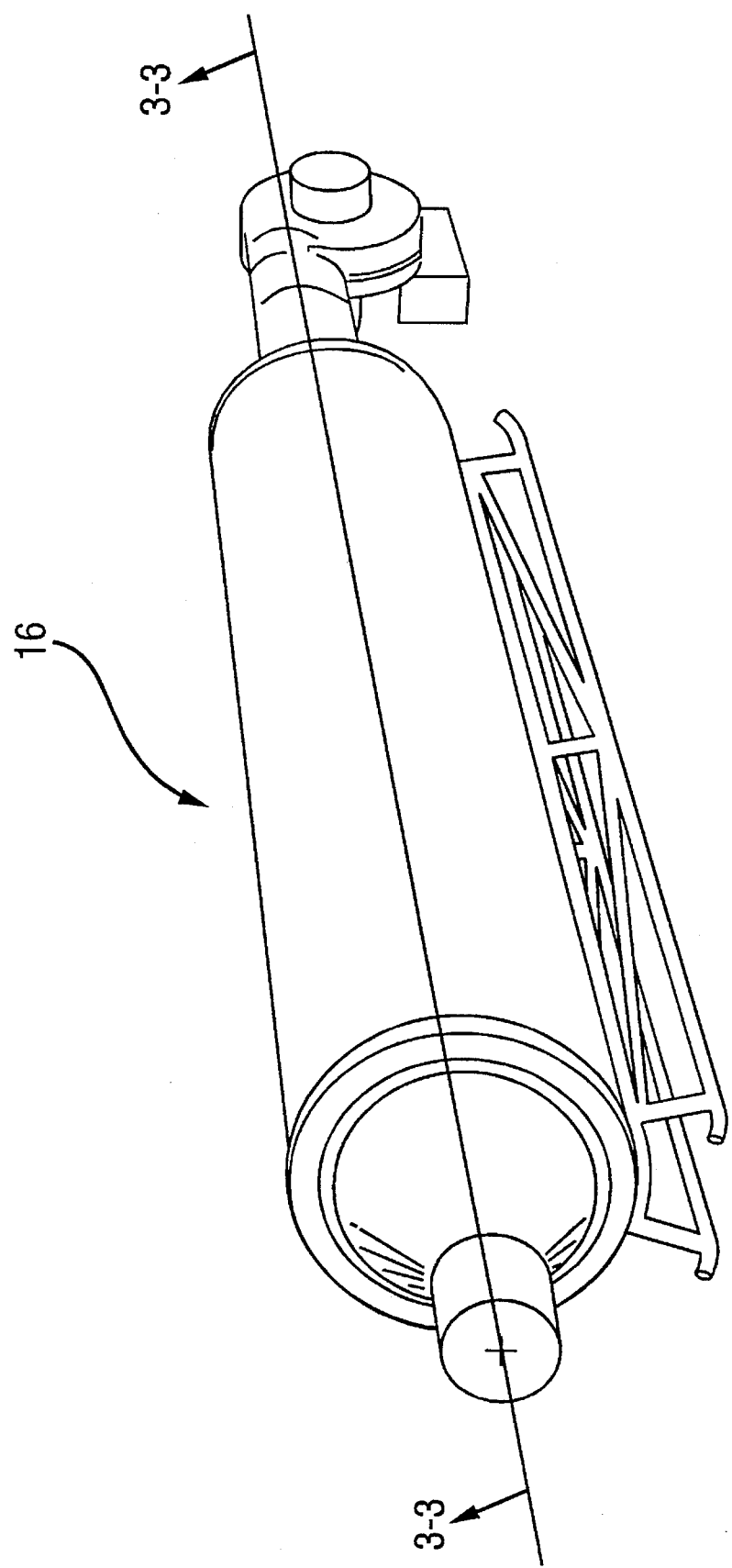
FIG. 2 is an perspective view of an apparatus of the present invention.
Figure 3:
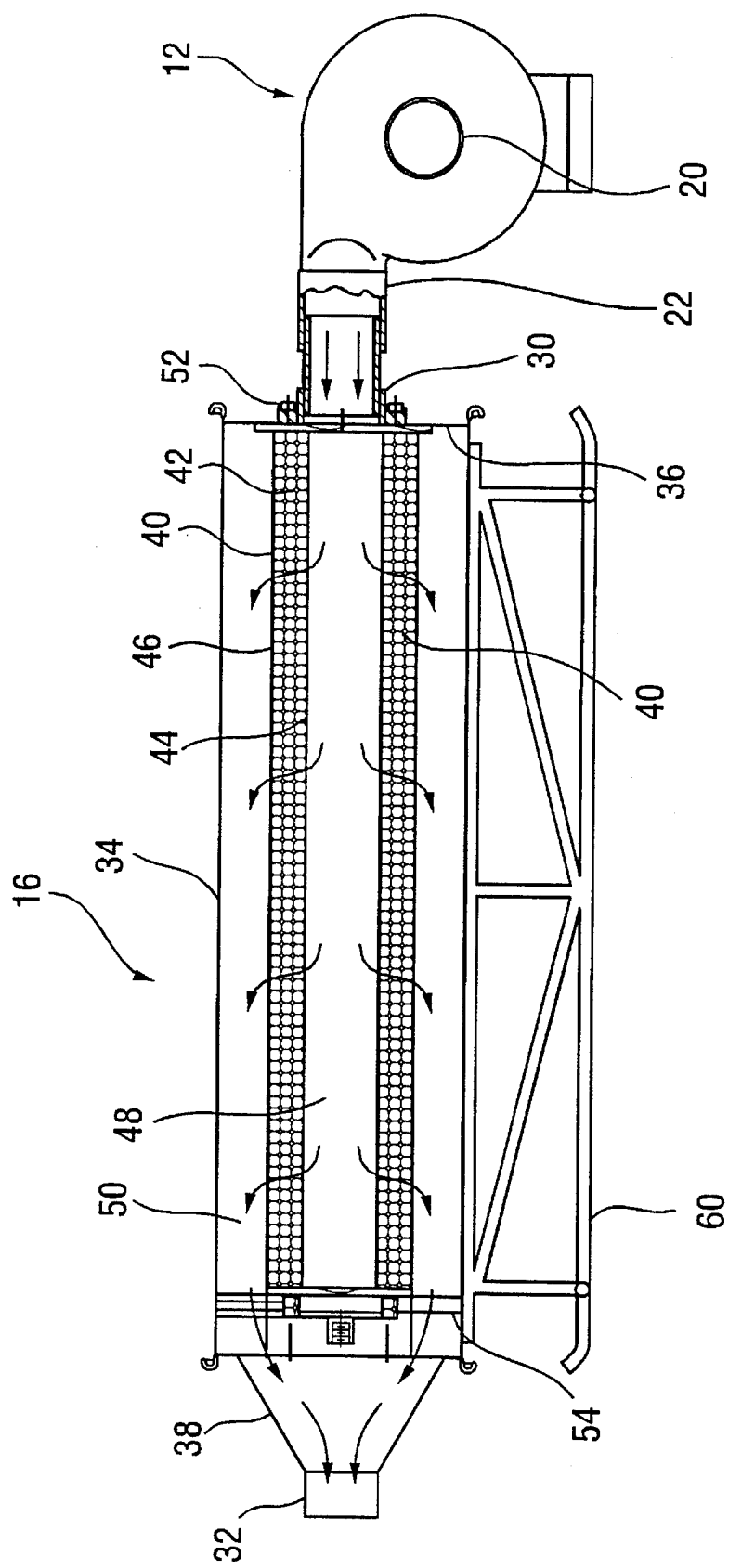
FIG. 3 is a cross-sectional view along section line 3—3 of FIG. 2.
Figure 4:
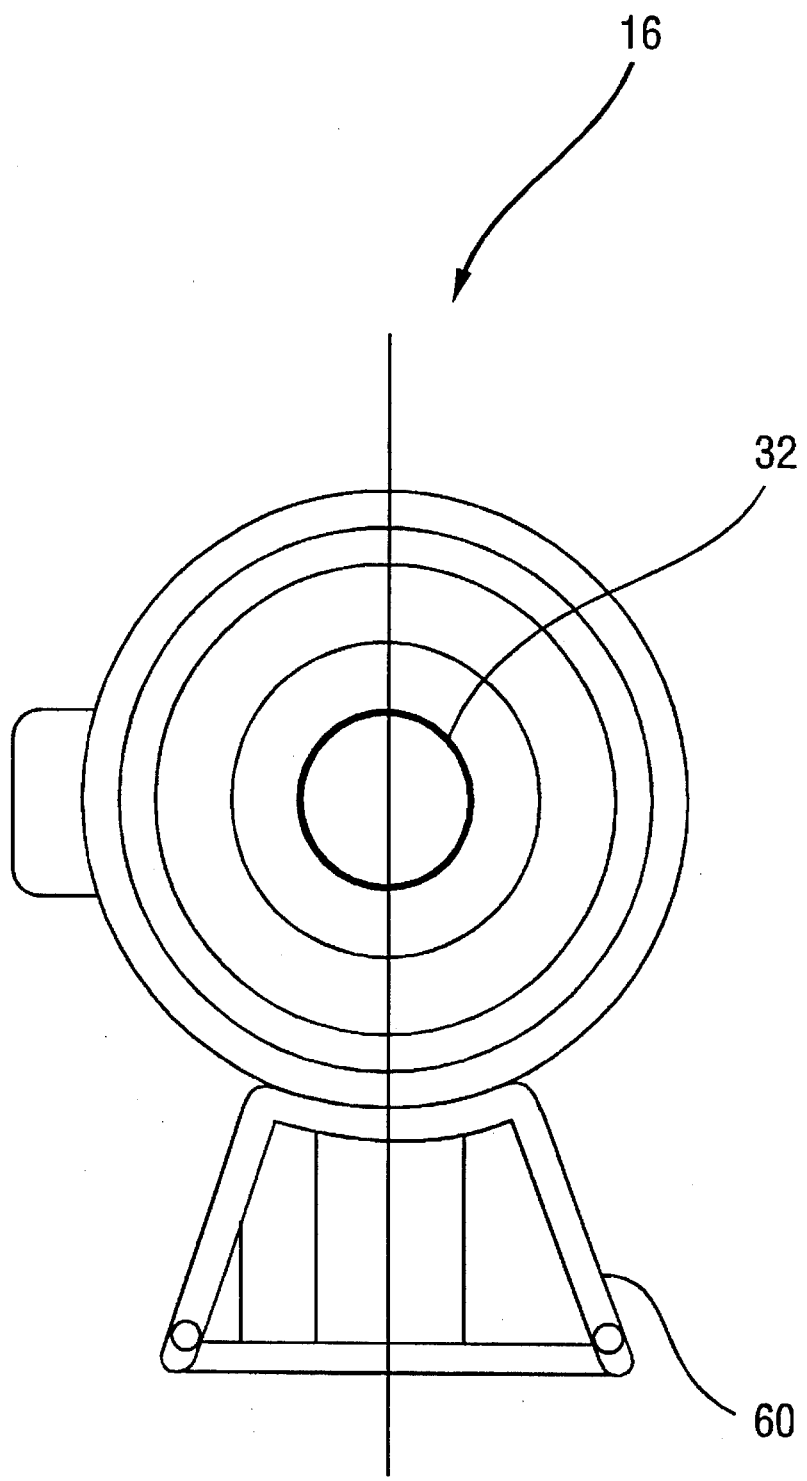
FIG. 4 is an end view of the apparatus shown in FIG. 2.

A preferred embodiment of adsorption unit 16 is shown in FIGS. 2–4. As shown in FIG. 2, adsorption unit 16 is generally cylindrical in shape. FIG. 3 illustrates a cross-sectional view of adsorption unit 16 along section line 3 of FIG. 2. FIG. 4 is an end view of adsorption unit 16. As shown more clearly in FIG. 3, adsorption unit 16 has cylindrical shaped air inlet part 30 and cylindrical shaped air outlet port 32. Adsorption unit 16 has cylindrically shaped outer wall 34 with first endwall 36 adjacent air inlet port 30. Second endwall 38, adjacent air outlet port 32, is generally funnel shaped. A skid 60 or other support means may be used to support adsorption unit 16. Preferably, adsorption unit 16 is small enough to be mobile such that the adsorption unit may readily service storage facilities of various types and at various locations.

Adsorbent bed 40 is supported within adsorption unit 16. Adsorbent bed 40 contains adsorbent material 42. Adsorbent bed 40 is generally annularly shaped and has inner wall 44 and outer wall 46. In one preferred embodiment, adsorbent bed 40 is approximately 65 inches long in the direction of the axis from end wall 36 to end wall 38. Further, the thickness of adsorbent bed 40 is approximately 3½ inches from innerwall 44 to outer wall 46.

Inner wall 44 and outer wall 46 are both gas permeable and are preferably constructed from a metal screen. Adsorbent bed inner wall 44 defines cylindrically shaped inner air passageway 48. Air inlet port 30 opens into inner passageway 48. Annularly shaped outer passageway 50 is formed between adsorbent bed outer wall 46 and adsorption unit outer wall 34. Adsorbent bed 40 may be supported within adsorption unit 16 by bolts 52 or other supporting means connected to endwall 36 and brackets 54 or other supporting means generally disposed at the end of adsorbent bed 40 that is adjacent second endwall 38. Adsorption unit 16 may be constructed, for example, from stainless steel using standard metal working methods. The present invention is not limited to the structure shown in FIGS. 2–4. The multi-pass recirculation method of the present invention may also use other designs for adsorption unit 16.

In a preferred embodiment, air flows from fan outlet 22 through air inlet port 30 into inner passageway 48. Air then flows through adsorbent bed 40. As air flows through adsorbent bed 40, the air and the fumigation gas contained within the air contacts adsorbent material 42. The fumigation agent is then adsorbed by adsorbent materials 42. After passing through adsorbent bed outer wall 46, air then flows through outer passageway 50. Finally, air flows along end wall 38 and out air outlet port 32. The arrows shown in FIG. 3 generally show this air flow pattern. Ducts 14 and 18 may be connected to adsorption unit 16 and fan 12 as shown in FIG. 1. In the embodiment shown in FIG. 1, duct 18 is connected to air outlet port 32 and duct 14 connects to fan inlet 20. However, as discussed above various connection schemes may be used. The air flow is not limited to the path shown in FIG. 3, and may flow opposite the direction shown. Thus, air may flow in air port 32 into outer passageway 50. In this case, air flows through adsorbent bed 40 into inner passageway 48 and out air port 30.

When removing hydrogen phosphide from the air, a preferred adsorbent is activated carbon "DESOREX K-AG 03" available from Lurgi Aktivkohle GmbH. This adsorbent comprises a coal based carbon adsorbent containing 0.3% silver metal. The adsorbent adsorbs phosphine from the air, then catalyzes its rapid oxidation to phosphates and lower oxidation state derivatives. This has the effect of increasing capacity of the material over conventional fumigation adsorbents, since the adsorption sites are quickly freed up as phosphine is catalytically oxidized by air. The present invention is not limited to this adsorbent, though, and other materials may be used.

In a preferred embodiment of the present invention, adsorption unit 16, as shown in FIGS. 2–4 and using Activated Carbon Desorex K-Ag 03, is arranged in a system such as shown in FIG. 1. A preferable air flow rate of approximately 900 cubic feet per minute (cfm) is used.

However, generally air flow rates of 100 to 2000 cfm are contemplated and especially air flow rates of 500 to 1000 cfm. Generally, fan powers of 0.25 to 1.5 horsepower and air duct sizes of 4 to 12 inches are contemplated and especially fan powers of 0.5 to 1.0 horsepower and air duct sizes of 6 to 10 inches. Thus, for example, with a 500,000 cubic foot storage structure one air exchange may be completed in approximately 9.25 hours. It is recognized, though, that multiple scrubber units may be affixed to a storage structure such that other air change times for the structure may be achieved.

The contact time for a gas flowing through adsorbent bed 40 using the preferred embodiment described above is generally 0.2 second, though, ranges from 0.05 to 0.6 seconds are contemplated and especially 0.1 to 0.4 seconds. Such flow rates and contact times using the preferred adsorbent will result in an efficiency of approximately 80% to 90% hydrogen phosphide removal per pass. For most hydrogen phosphide removal purposes, two air exchanges would thus provide generally sufficient fumigation gas removal of greater than 96%. It is recognized that for alternative fumigation gases, adsorbents, and adsorption units, different flow rates, efficiency rates, and contact times may be preferred. Furthermore, the present invention is not limited to use with adsorbent materials, but rather may also be used with absorbent materials. However, the advantages of multi-pass recirculation fumigation gas removal would still be obtained.

The adsorption unit of the present invention has an advantage of being portable. In the preferred embodiments described above, the unit may contain only approximately 100 pounds of adsorbent and have a total weight of approximately 200 pounds. Thus, the unit may be transported from one storage structure to another. For example, the unit could be loaded in a truck or other vehicle for easy movement from site to site.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size, and arrangement of parts. For example, equivalent elements or materials may be substituted for those illustrated and described herein, and certain features of the invention may be utilized independently of the use of other features, all as would be apparent to one skilled in the art after having the benefit of this description of the invention.

What is claimed is:

1. An apparatus for removing a gasiform fumigant from air contained within an agricultural storage structure, comprising:

a housing;

an adsorption unit contained within said housing, said adsorption unit comprising:

a first port constructed and arranged to enable air to flow between said adsorption unit and said structure, a second port constructed and arranged to enable air to flow between said adsorption unit and said structure, an adsorbent bed within said adsorption unit containing adsorbent material, said adsorbent bed having an inner wall and outer wall, an inner air passageway formed by said inner wall of said adsorbent bed, said inner air passageway constructed and arranged to provide a path for air to flow between said first air port and said adsorbent bed, and an outer air passageway formed between said outer wall of said adsorbent bed and said housing, said outer air passageway providing a path for air to flow between said second air port and said adsorbent bed; and a fan connected to said adsorption unit for recirculating air from said structure, through said adsorption unit, and back into said structure.

2. The apparatus of claim 1 wherein said adsorption unit is portable.

3. The apparatus of claim 1 wherein said adsorbent bed is generally annularly shaped and said inner air passageway is generally cylindrically shaped.

4. The apparatus of claim 3 wherein said outer air passageway is generally annularly shaped.

5. The apparatus of claim 3, wherein said fan forces air from said structure into said first port and out of said second port.

6. The apparatus of claim 3, further comprising:

a first duct connected between said structure and said fan; and a second duct connected between said adsorption unit and said structure.

7. An apparatus for adsorbing a gasiform fumigant from air contained in an agricultural storage unit, which comprises:

a mobile supporting member;

a housing mounted on said supporting member;

a dual wall structure disposed within said housing, said structure having a first and an second wall, said walls being generally coaxial and gas permeable, and defining a first annular space between said first wall and said housing and defining a second annular space between said first wall and said second wall;

a fumigant adsorbent disposed in said second annular space;

an inlet constructed and arranged to receive gas containing fumigant from a first port of said storage unit; and an outlet to discharge gas from said first annular space to a second port of said storage unit.

8. The apparatus of claim 7 wherein said housing is generally cylindrical.

9. The apparatus of claim 7 wherein said inlet and said outlet are cylindrical.

10. An apparatus for adsorbing a gasiform fumigant from air contained in an agricultural storage unit having a first port and a second port, which comprises:

a housing;

a dual wall structure disposed within said housing, said structure having an inner and an outer wall, said walls being generally coaxial and gas permeable, and defining an outer air passageway between said outer wall and said housing and defining an inner air passageway between said inner wall and said outer wall;

a fumigant adsorbent disposed between said inner and outer walls;

an air inlet port constructed and arranged to discharge said air containing said fumigant from said first port of said storage unit to said inner air passageway; and an air outlet port to discharge said air from said outer air passageway to said second port of said storage unit.

11. The apparatus of claim 10 wherein said outer air passageway is generally annular.

12. The apparatus of claim 10 wherein said inner air passageway is generally cylindrical.

13. The apparatus of claim 10 wherein said air inlet port is cylindrical.

14. The apparatus of claim 10 wherein said air outlet port is cylindrical.

15. An apparatus for adsorbing a gasiform fumigant from air contained in an agricultural storage unit said storage unit having a first port and a second port, said apparatus comprising:

a housing;

a fumigant adsorbent bed disposed within said housing for sorbing said fumigant;

an air inlet port constructed and arranged to discharge said air containing said fumigant from said first port of said storage unit to said fumigant adsorbent;

an air outlet port to discharge said air from said fumigant adsorbent bed to said second port of said storage unit; and a fan connected to said fumigant adsorbent bed for recirculating said air through said fumigant adsorbent bed such that the concentration of said fumigant in said air exiting said fumigant adsorbent bed is less than a selected level.

16. The apparatus of claim 15 wherein said fumigant adsorbent bed contains an adsorbent for said fumigant in a quantity such that a single pass of said air through said fumigant adsorbent bed is inadequate to reduce the concentration of said fumigant in said air exiting said adsorption unit to a level below a selected level.

17. The apparatus of claim 15 wherein said fumigant adsorbent bed has an inner wall and an outer wall, and said apparatus further comprises:

an inner air passageway formed by said inner wall of said adsorbent bed, said inner air passageway providing a path for said air to flow between said air inlet port and said fumigant adsorbent bed, and an outer air passageway formed between said outer wall of said adsorbent bed and said adsorption unit, said outer air passageway providing a path for said air to flow between said air outlet port and said adsorbent bed.

18. The apparatus of claim 15 wherein said fumigant adsorbent bed is generally annularly shaped.

* * * * *